Patented Apr. 29, 1941

2,239,706

UNITED STATES PATENT OFFICE 2,239,706

NITROGENOUS COMPOUNDS

Albert K. Epstein and Morris Katzman, Chicago, Ill., assignors to The Emulsol Corporation, Chicago, Ill., a corporation of Illinois No Drawing. Application July 29, 1939,
Serial No. 287,255

18 Claims. (Cl. 260—295)

This invention related to new chemical compounds which are characterized by possessing interface modifying properties rendering the same highly useful for the purposes for which such agents are employed in the various arts.

The compounds of the present invention are, in general and for the most part, derivatives of polyamines in which hydrogen of at least one amine group is replaced by a carboxylic acyl radical containing at least four but preferably from eight to eighteen carbon atoms, and in which hydrogen of at least one different amine group is replaced by a carboxylic acyl radical of a polycarboxylic acid containing nitrogen preferably in the form of a quaternary ammonium radical. By the term "quaternary ammonium radical" is meant a radical containing a pentavalent nitrogen wherein four valences are satisfied by carbon and the fifth valence by an anion.

At least most of the novel compounds fall within the scope of the general formulae

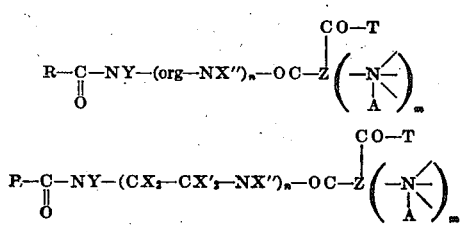

wherein

is an acyl radical containing at least four and particularly from twelve to eighteen carbon atoms, Y, X, X' and X'' are the same or dissimilar members selected from the group consisting of hydrogen, alkyl, cycloalkyl, and alkylol, org is a hydrocarbon residue, saturated or unsaturated, with or without interruptions or substitutions, Z is a residue, generally a carbon-hydrogen residue of a polycarboxylic acid, preferably aliphatic and preferably containing not more than eight carbon atoms, A is an anion, T is (1) a member of the group comprising NHR' where R' is hydrogen, lower alkyl, hydroxy-alkyl, and cycloalkyl, or (2) OY where Y is a cation, lower alkyl, cycloalkyl and aliphatic polyhydric alcohol radicals, $m$ is a whole number, preferably one or two, $n$ is a whole number, preferably from one to four, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member.

A more limited aspect of the compounds of the invention may be represented by the general formula

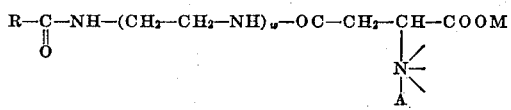

wherein

is an aliphatic acyl radical containing at least eight and preferably from twelve to eighteen carbon atoms, M is a cation, and $w$ is a small whole number, preferably from one to four.

The radical

in the above formula may be of aliphatic, cycloaliphatic, aromatic or aromatic-aliphatic character, as will be pointed out hereinafter, and may contain substituent groups such as halogen, amino, hydroxy, sulphate, sulphonic, phosphate, carboxyl, nitrile, and the like, but it is particularly preferred that it be unsubstituted aliphatic or fatty and contain from twelve carbon atoms to eighteen carbon atoms. Z and org may also each contain substituent groups such as those mentioned and the sequence of carbon atoms therein may be interrupted by O, S, C=O, NH, NR where R is alkyl, and the like.

In order that the nature of the invention may become apparent, there are listed hereinbelow representative compounds which fall within the scope of the invention.
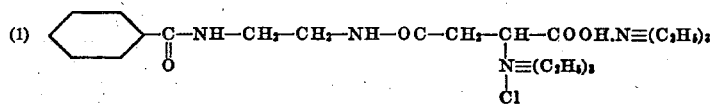
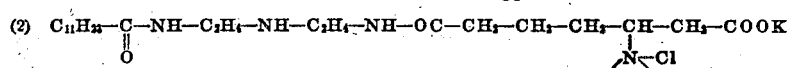
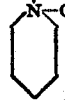
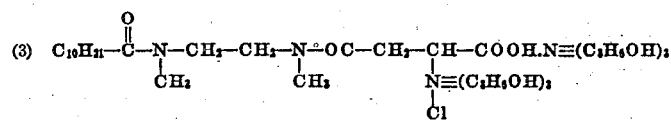
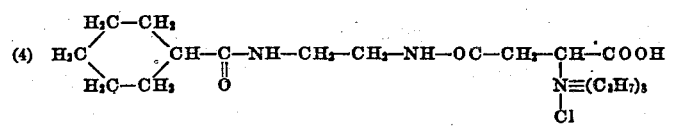
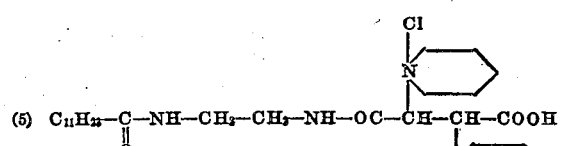
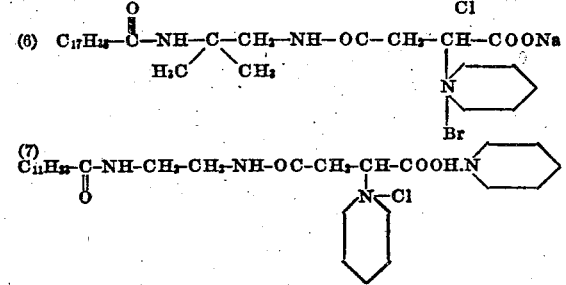
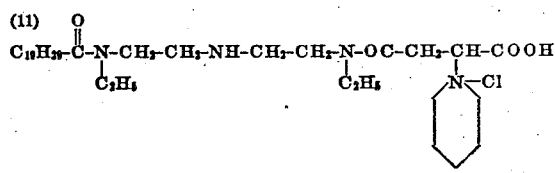
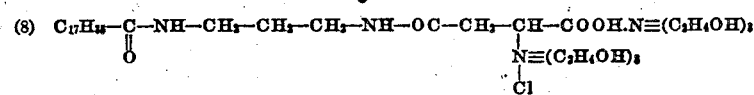
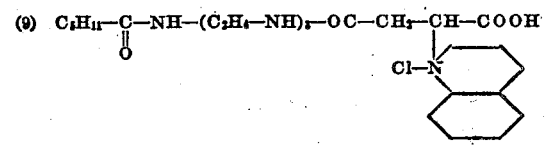
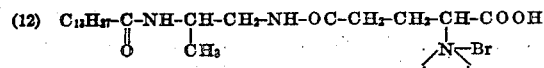
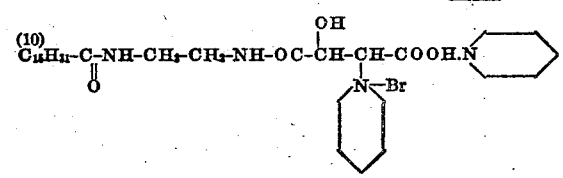
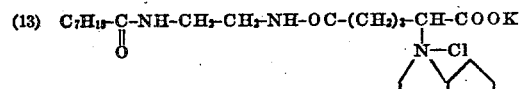
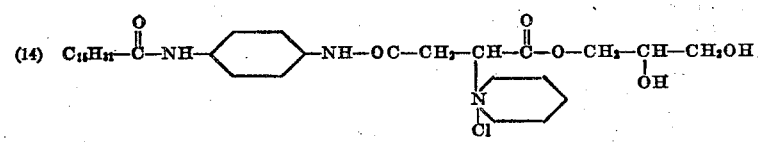
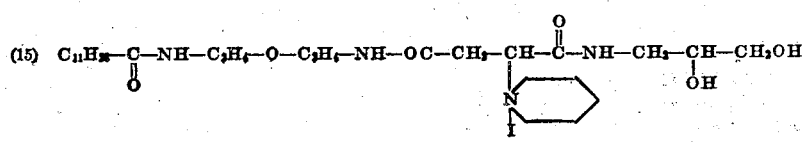

(16) 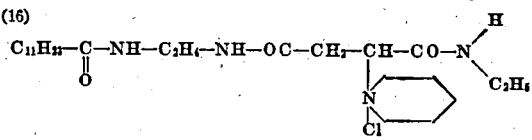

(17) 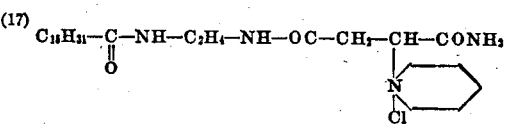

(18) 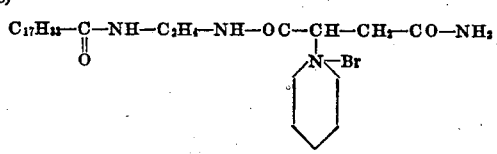

(19) 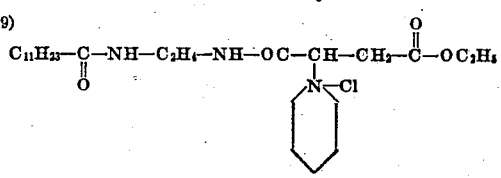

(20) 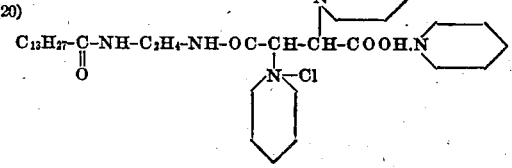

(21) 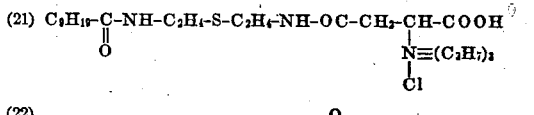

(22) 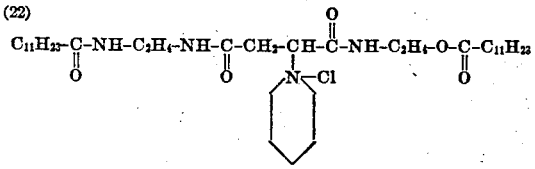

While the above examples represent single substances, it will be understood that in practice it is, in general, more advantageous to employ mixtures of any two or more thereof with or without diluents.

In general, the compounds are prepared by initially reacting a polyamine, for example, ethylene diamine (H₂N—C₂H₄—NH₂) with a higher molecular weight carboxylic acid or derivative thereof such as halide, under conditions such as to insure a substantial yield of amide. The resulting amide is then reacted with a preferably lower molecular weight halogeno-poly-carboxylic acid or halide or other derivative thereof to produce another amide linkage and with an organic nitrogenous base such as pyridine to produce a pentavalent nitrogen. It will be clear, of course, that the order of the steps may be reversed, if desired; that is, the reaction with the higher molecular weight acid or derivative thereof may be carried out last, or the two amidification steps may be carried out in optional order and the reaction with the pyridine or the like may be carried out thereafter.

An alternative method comprises utilizing an unsaturated polycarboxylic acid or anhydride or other derivative such as maleic acid, maleic anhydride, fumaric acid, ethyl maleate or the like, in place of the halogeno-polycarboxylic acids or their halides in the reaction described hereinabove. In this event, the amide reaction product may be treated with halogen, halogen acid such as hydrochloric or hydrobromic acid, or with a hypohalogen acid such as hypochlorous acid or hypobromous acid, whereby halogen is introduced into the molecule at a double bond of the polycarboxylic acid radical. The resulting compound may then be treated with an organic nitrogenous base such as pyridine, quinaldine, tripropyl amine or the like.

The following examples are illustrative of methods which have been found suitable for preparing various of the compounds which are disclosed herein. It will be appreciated that other methods may be utilized, that the proportions of reacting ingredients, times of reaction, order of steps, and temperatures may be varied and that supplementary processes of purification and the like may be resorted to wherever found desirable or convenient. These and other variations and modifications will be evident to those skilled in the art in the light of the guiding principles which are disclosed herein.

Example A (1) 2.7 grams of the mono amide of ethylene diamine and a mixture of substantially equal parts of lauric and myristic acids

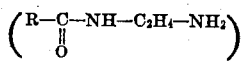

were dissolved in 5 cc. of dry dioxane and there were added thereto, with stirring, 2.8 grams of di-brom succinic anhydride. The temperature rose to 75 degrees C. where it was held for approximately 5 minutes and was then allowed to cool to room temperature. 5 cc. of pyridine were then added and the mass was allowed to stand for a period of 24 hours. The excess pyridine was then washed out with petroleum ether. The desired compound, which was insoluble in the petroleum ether, was then dried. It had foaming and wetting properties and contained a substantial proportion of a compound having the following probable formula:

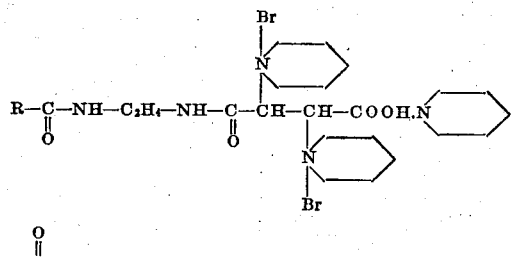

(R—C̈— is acyl radical of mixture of substantially equal parts of lauric and myristic acids.)

(2) The di-brom succinic anhydride utilized in Part 1 hereof was prepared by adding 100 cc. of dry chloroform and 113.5 grams of bromine to 71 grams of maleic anhydride, mixing the same and exposing the mixture to sunlight for a period of 5 to 6 hours. The chloroform was then evaporated in vacuo at 50–60 degrees C., leaving primarily di-brom succinic anhydride.

Example B (1) 107.2 grams of the methyl ester of a mixture of substantially equal parts of lauric and myristic acids and 52.6 grams of hydroxy ethyl ethylene diamine were heated together for a period of 1½ hours, with stirring, at a temperature from 160 to 250 degrees C.

(2) 3.2 grams of the reaction product of Part 1 hereof were dissolved in 5 cc. of dry dioxane and 2.8 grams of di-brom succinic anhydride were then added, with stirring, the temperature spontaneously rising from 30 degrees C. to 80 degrees C., at which latter temperature the mixture was held for approximately 5 minutes. It was then cooled to room temperature and 5 cc. of pyridine were added, with stirring, the temperature rising to 55 degrees C. The mass was then allowed to stand for 24 hours and a small amount of alcoholic potassium hydroxide was added to neutralize the carboxyl group. The excess pyridine was then washed out with petroleum ether and the residue was dried. It possessed foaming, wetting and detergent properties and contained a substantial proportion of a compound having the following probable formula:

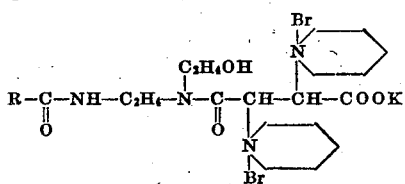

*Example C*

3.2 grams of the reaction product of Part 1 of Example B hereinabove, 5 cc. of dry dioxane and 1.1 grams of maleic anhydride were mixed together, the temperature spontaneously rising to 70 degrees C. The mixture was then heated to 90 degrees C. and held at that temperature for approximately 10 minutes. It was then cooled to 10 degrees C. and 20 cc. of a 5.5% solution of sodium hypochlorite were added, the mass being maintained in an ice bath and stirred therein for a period of about 2 hours. A small amount of sodium sulphite was then added to eliminate the excess sodium hypochlorite. 5 cc. of concentrated hydrochloric acid were then added and the reaction mass was washed twice, each time with 100 cc. portions of cold water, the mass being salted out after each washing with 20 grams of sodium chloride. The product was then treated with ethyl ether and dried. To the dry product, 5 cc. of pyridine were added and the mass was allowed to stand for approximately 24 hours. It had foaming and wetting properties and contained a substantial proportion of a compound having the following probable formula:

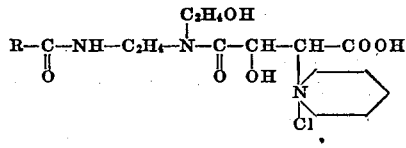

*Example D*

10.3 grams of diethylene triamine were dissolved in 50 cc. of dry dioxane and there were added thereto, slowly and with stirring, 18 grams of dichlor succinic anhydride. The temperature spontaneously rose from 25 degrees C. to 70 degrees C. at which latter temperature the reaction mass was held for approximately 10 minutes. It was then cooled to 30 degrees C. and there were added thereto, dropwise and with stirring, while maintaining the mass in a cold water bath, 22 cc. of lauroyl chloride. At the completion of the addition of the lauroyl chloride, the temperature of the reaction mass was approximately 40 degrees C. It was then cooled to room temperature and 40 grams of triethyl amine were added thereto and the resulting mixture was allowed to stand for 24 hours. It has foaming and wetting properties and contained a substantial proportion of a compound having the following probable formula:

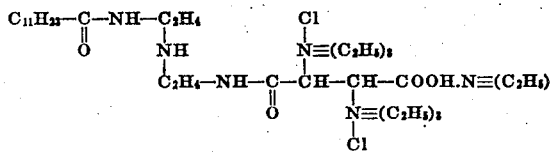

*Example E*

25 grams of the lauric acid mono amide of ethylene diamine were dissolved in 50 cc. of dry dioxane and 25 grams of mono-brom-tricarbally-lic anhydride were added thereto, with stirring. The temperature spontaneously rose to 70 degrees C. and the reaction mass was maintained at that temperature for approximately 10 minutes. The mass was then cooled to room temperature and 32 cc. of pyridine were added thereto and the mass was allowed to stand for approximately 24 hours. The product was water soluble, had foaming and wetting properties, and contained a substantial proportion of a compound having the following probably formula:

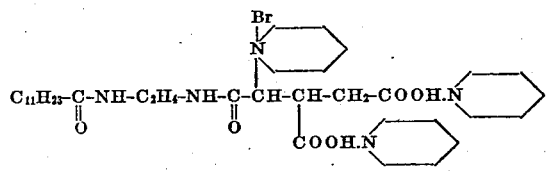

The acyl radical represented by

in the general formulae may, as stated, be derived from various sources. Among such sources may be mentioned straight chain and branched chain carboxylic, aliphatic, and fatty acids or derivatives thereof such as halides, saturated and unsaturated, such as butyric acid, caprylic acid, caproic acid, capric acid, sebacic acid, behenic acid, arachidic acid, cerotic acid, erucic acid, melissic acid, stearic acid, oleic acid, ricinoleic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil, partially or completely hydrogenated animal and vegetable oils such as those mentioned; hydroxy and alpha-hydroxy higher aliphatic and fatty acids such as i-hydroxy stearic acid, dihydroxystearic acid, alpha-hydroxy stearic acid, alpha-hydroxy palmitic acid, alpha-hydroxy lauric acid, alpha-hydroxy coconut oil mixed fatty acids, and the like; fatty acids derived from various waxes such as beeswax, spermaceti, montan wax, and carnauba wax and carboxylic acids derived, by oxidation and other methods, from petroleum; cycloaliphatic and hydroaromatic acids such as hexahydrobenzoic acid, resinic acids, naphthenic acid and abietic acid; aromatic acids such as phthalic acid, benzoic acid, naphthoic acid, pyridine carboxylic acids; hydroxy aromatic acids such as salicyclic acid, hydroxy benzoic and naphthoic acids, and the like; and substitution and addition derivatives, particularly halogen substitution and addition derivatives of the aforementioned carboxylic substances. It will be understood that mixtures of any two or more of said acids may be employed if desired.

It has previously been indicated that the anion represented by the letter A in the general formula illustrating most of the novel agents of the present invention is preferably a solubilizing anion such as chlorine, bromine or iodine. Other anions may be substituted therefor as, for example, OH$^-$, HSO$_4^-$, RSO$_4^-$, C$_6$H$_5$SO$_3^-$, NO$_3^-$, acetate, propionate, caproate, laurate, oleate, stearate, borate, phosphate, or some other organic or inorganic anion. As a general rule the halogen derivatives are particularly satisfactory.

The unsaturated polycarboxylic acids, their anhydrides and esters, and the halogeno-polycarboxylic acids or other derivatives thereof, preferably in the form of their esters with ethyl alcohol or the like, which are reacted with the polyamines, may be selected from a relatively large class including aliphatic and aromatic compounds such as, for example, maleic acid, maleic anhydride, ethyl maleate, fumaric acid, monochlor succinyl chloride, di-chlor succinyl chloride, mono-chlor succinic acid, di-chlor succinic acid, ethyl chlor-succinate, di-chlor glutaryl chloride, and the corresponding derivatives of malonic acid, citraconic acid, mesaconic acid, itaconic acid, mucic acid, adipic acid, pimelic acid, sebacic acid, suberic acid, azelaic acid, aconitic acid, phthalic acids, and the like. Of particular utility are maleic acid, fumaric acid, ethyl maleate and maleic anhydride.

The polyamines which are employed in the reactions may be selected from a large group, particularly the alkylene polyamines and polyalkylene polyamines and the alkyl and aralkyl derivatives as, for example, ethylene diamine, piperazine, diethylene triamine, triethylene tetraamine, mono-methyl ethylene diamine, benzidine, ortho-, meta- and para-phenylene diamine, mono-ethyl diethylene triamine, beta-dimethylamino-ethyl amine, and the like. As indicated hereinabove, the polyamines may, in certain cases, contain substituent groups such as halogen, hydroxy, and the like.

The nitrogen present in the novel substances of the present invention in the form of quaternary ammonium radicals or the like may be introduced into the molecule by means of various organic nitrogenous bases as, for example, alcohol amines and alkylol-, arylol- and aralkylol amines including mono-, di and tri-ethanolamine and mixtures thereof such as are, for example, present in so-called commercial triethanolamine, propanolamines, butanolamines, pentanolamines, hexanolamines, glycerolamines, dibutyl ethanolamine, diethanol ethyl amine, cyclohexyl ethanolamine, diethanol cyclohexylamine, ethanol aniline, alkylol polyamines such as alkylol derivatives of ethylene diamine, mono-methyl mono-ethanolamine, diethyl-mono-ethanolamine, 1-amino-2,3 propanediol, 1,2-diaminopropanol; alkylamines such as butyl amine, hexylamine dimethylamine, ethylene diamine, diethylene triamine, triethylene tetra-amine, mono-methyl ethylene diamine, mono-ethyl diethylene tetra-amine, mono-allyl amine, aromatic and heterocyclic bases such as benzylamine, cyclo-hexylethyl-aniline, morpholine, pyridine, alkyl pyridines such as methyl-pyridine, piperidine, pyrrolidines, quinoline, quinaldine, nicotine, and homologues and derivatives or substitution products thereof; mixtures of any two or more thereof, and the like. It will be understood that these organic bases, as in the case of triethanolamine, for example, may be employed in pure, impure, or commercial form. It will also be understood that quaternary ammonium compounds result when bases utilized are tertiary organic nitrogenous bases.

In certain instances, as indicated, by way of illustration, in Examples 4, 5, 9, 11 and 12, a free carboxyl group may be present in the compounds. Such compounds may be further reacted to esterify or amidify the free carboxyl group to convert the same into the groups —CONH$_2$, —CONHR, and COOR where R is preferably lower molecular weight alkyl or cycloalkyl such as ethyl, butyl, cyclohexyl, and the like, which may contain substituent groups such as halogeno, hydroxy, amino, cyanogen and the like. In the case of the ester linkage, that is, the —COOR group, the radical R may be that of a polyhydric alcohol or polyhydroxy substances such as glycerol, glycols, and polyglycols such as ethylene glycol, propylene glycol, butylene glycol, diethylene glycol, polyglycerols, and the like. Such derivatives have particularly desirable properties in the technical and industrial arts. The usual amidification and esterification procedures can readily be adapted by the skilled chemist to the preparation of such derivatives.

The compounds of this invention have utility in various arts in which interface modifying agents are employed. They are resistant to precipitation by calcium and magnesium salts and are compatible with acid and alkali media. They may be utilized in the textile and related industries wherein they function for softening, wetting, detergent, emulsifying, penetrating, dispersing, frothing and foaming purposes. The textiles, various treatments of which in the presence of the agents of the present invention are rendered effective, comprise natural products such as cotton, wool, linen and the like as well as the artificially produced fibres (and fabrics), such as rayon, cellulose acetates, cellulose ethers and similar artificial products. It will be understood, of course, that the agents may be used in aqueous and other media either alone or in combination with other suitable salts of organic or inorganic character or with other interface modifying agents. In the dyeing of textiles they may be employed as assistants in order to bring about even level shades. They may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agriculture purposes. They have utility in the preparation of cosmetic creams such as cold creams, vanishing creams, tissue creams, shaving creams of the brushless and lathering type and similar cosmetic preparations. Another use to which the agents of the present invention may be placed is for the treatment of paper pulp and paper where they may be employed, for example, as penetrating agents in the cooking of the paper pulp or the like. Their capillary or interfacial tension reducing properties enables them to be employed in the fruit and vegetable industry in order to effect the removal from fruits and the like of arsenical and similar sprays. They possess marked utility in the ore dressing industry wherein they function effectively in froth flotation processes, particularly for the separation of silica from ores containing the same. Their interface modifying properties also permit their use in lubricating oils and the like enabling the production of effective boring oils, cutting oils, drilling oils, wire drawing oils, extreme pressure lubricants and the like. They may also be used with effect in the preparation of metal and furniture polishes, as pickling inhibitors in metal cleaning baths, in shoe polishes, in rubber compositions, for breaking or demulsifying petroleum emulsions such as those of the water-in-oil type which are encountered in oil-field operations, and for various other purposes which will readily occur to those versed in the art in the light of the disclosure herein.

As detergents, they may be employed for the preparation of shampoos, dentifrices and the like. In general, they may be dissolved in water or aqueous media and utilized in that form or, in the case of solid products, they may be packaged and sold in such form preferably mixed with diluents. They may also be utilized for commercial cleaning, laundering and washing operations with marked advantage.

The products of the present invention may be employed alone or together with lesser or greater quantities of inorganic or organic compounds. Thus, for example, they may be employed together with salts such as sodium chloride, alkali metal phosphates including pyrophosphates and tetraphosphates, sodium sulphate, alums, perborates such as sodium perborate, and the like. They may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophillic gums including pectin, tragacanth, karaya, locust bean, gelatin, arabic and the like, glue, vegetable, animal, fish and mineral oils, solvents such as carbon tetrachloride, monoethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alkyl sulphates, phosphates, pyrophosphates and tetraphosphates as, for example, lauryl sodium sulphate, myristyl sodium pyrophosphate, cetyl sodium tetraphosphate, octyl sodium sulphate, oleyl sodium sulphate, and the like; higher molecular weight sulphonic acid derivatives such as cetyl sodium sulphonate and lauryl sodium sulphonate; sulpho-carboxylic acid esters of higher molecular weight alcohols such as lauryl sodium sulphoacetate, dioctyl sodium sulpho-succinate, dilauryl potassium sulpho-glutarate, lauryl monoethanolamine sulphoacetate, and the like; sulphuric and sulphonic derivatives of condensation products of alkylolamines and higher fatty acids; phosphoric, pyrophosphoric and tetra-phosphoric acid esters of higher molecular weight alcohols; Turkey-red oils; compounds of the type of isopropyl naphthalene sodium sulphonate, and other classes of wetting agents.

Wherever the term "higher" is employed as referring to higher molecular weight organic acids, it will be understood to cover at least six carbon atoms unless otherwise specifically stated.

What we claim as new and desire to protect by Letters Patent of the United States is:

1. Chemical compounds correspondings to the general formula:

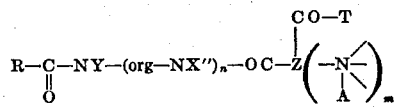

wherein

is an acyl radical containing at least four carbon atoms, Y and X'' are the same or dissimilar members selected from the group consisting of hydrogen, alkyl, cycloalkyl and alkylol, org is an organic residue containing at least two carbon atoms, Z is the residue of a polycarboxylic acid, A is an anion, T is (1) a member selected from the group consisting of NHR' where R' is hydrogen, lower alkyl, hydroxy-alkyl or cyclo alkyl or (2) OY where Y is a cation, lower alkyl, cycloalkyl or an aliphatic polyhydric alcohol radical, $m$ and $n$ are small whole numbers, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member.

2. Chemical compounds corresponding to the general formula

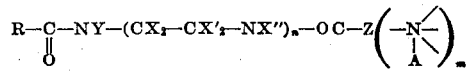

wherein

is an acyl radical containing at least four carbon atoms, Y, X, X' and X'' are the same or dissimilar members selected from the group consisting of hydrogen, alkyl, cycloalkyl, and alkylol, —OC—Z is a carboxylic acyl radical of a polycarboxylic acid, A is an anion, $m$ and $n$ are whole numbers, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member.

3. Quaternary ammonium chemical compounds corresponding to the general formula

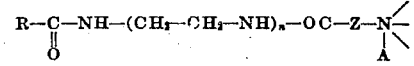

wherein

is an acyl radical containing from eight to eighteen carbon atoms, —OC—Z is a carboxylic acyl radical of a dicarboxylic acid, A is an anion, $n$ is a number ranging from one to three, and the three indicated valence bonds attached to nitrogen are satisfied by radicals of the class consisting of alkyls, cycloalkyls, alkylols, aralkyls, aryls, aralkylols, and the radical of a heterocyclic ring of which the nitrogen is a member.

4. Chemical compounds corresponding to the general formula

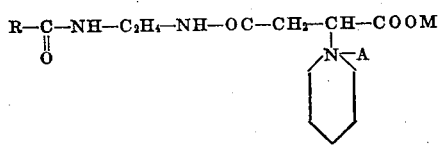

wherein

is an acyl radical containing from eight to eighteen carbon atoms, A is halogen, and M is a cation.

5. Chemical compounds corresponding to the general formula

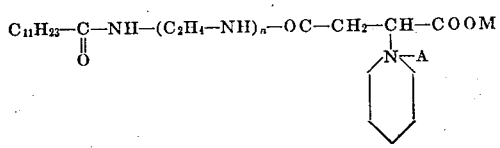

wherein $n$ is a whole number, A is halogen, and M is a cation.

6. Chemical compounds corresponding to the general formula

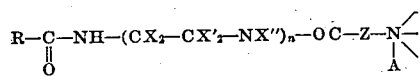

wherein

is an acyl radical containing at least six carbon atoms, X, X' and X'' are the same or dissimilar members selected from the group consisting of hydrogen, alkyl, cycloalkyl and alkylol, —OC—Z is a carboxylic acyl radical of an aliphatic dicarboxylic acid containing not more than eight carbon atoms, A is an anion, $n$ is a whole number, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member.

7. Quaternary ammonium chemical compounds corresponding to the general formula

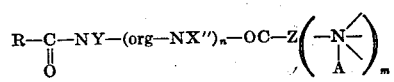

wherein

is an acyl radical containing at least six carbon atoms, Y and X'' are the same or dissimilar members selected from the group consisting of hydrogen, alkyl, cycloalkyl, and alkylol, org is an organic residue containing at least two carbon atoms, —OC—Z is a carboxylic acyl radical of a polycarboxylic acid, $n$ and $m$ are whole numbers, and the three indicated valence bonds attached to nitrogen are satisfied by radicals of the class consisting of alkyls, cycloalkyls, alkylols, aralkyls, aryls, aralkylols, and the radical of a heterocyclic ring of which the nitrogen is a member.

8. Chemical compounds corresponding to the general formula

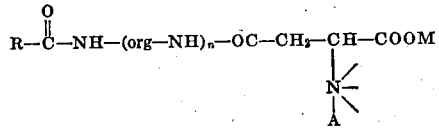

wherein

is an aliphatic acyl radical containing from eight to eighteen carbon atoms, org is an aliphatic organic residue containing at least two carbon atoms, A is halogen, M is a cation, $n$ is a whole number, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member.

9. Chemical compounds corresponding to the general formula

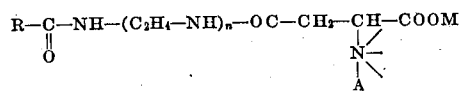

wherein

is a fatty acid acyl radical containing from eight to eighteen carbon atoms, A is halogen, M is a cation, $n$ is a whole number, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member.

10. Chemical compounds corresponding to the general formula

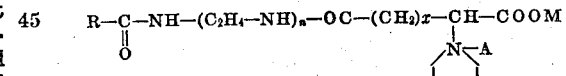

wherein

is a fatty acid acyl radical containing from eight to eighteen carbon atoms, A is halogen, M is a cation, and $n$ and $x$ are whole numbers ranging from one to four.

11. Chemical compounds corresponding to the general formula

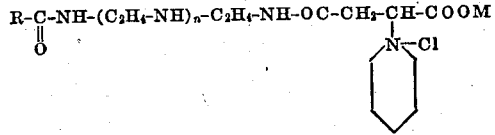

wherein

is an acyl radical containing from eight to eighteen carbon atoms, M is a cation, and $n$ is zero or a whole number.

12. A method of preparing chemical compounds which comprises reacting, in optional order, a polyamine with a member selected from the group consisting of higher molecular weight carboxylic acids, their anhydrides, esters, and halides containing at least six carbon atoms, to produce a substantial yield of an amide, then reacting the resulting amide with a tertiary nitrogenous base and with a member selected from the group consisting of halogeno-polycarboxylic acids and halides thereof.

13. The method of claim 12 wherein the polyamine falls within the scope of the formula:

$$H_2N-(CX_2-CX'_2-NH-)_nCX''_2-CX'''_2-NH_2$$

wherein X, X', X" and X'" are similar or dissimilar members selected from the group consisting of hydrogen, alkyl, cycloalkyl, and alkylol, and $n$ is zero or a whole number.

14. The method of claim 12 wherein the polyamine falls within the scope of the following formula $$H_2N-(C_2H_4-NH-)_nC_2H_4-NH_2$$

wherein $n$ is zero or a whole number.

15. A method of preparing chemical compounds which comprises reacting an ester of a halogeno-polycarboxylic acid with a tertiary nitrogenous base and reacting the resulting product with a higher organic acid amide of a polyamine.

16. The method of claim 15 wherein the tertiary nitrogenous base is heterocyclic, the organic acid amide is derived from a fatty acid containing from 8 to 18 carbon atoms and the polyamine falls within the scope of the following formula $$H_2N-(C_2H_4-NH-)_n-C_2H_4-NH_2$$

wherein $n$ is zero or a whole number.

17. A method of preparing chemical compounds which comprises reacting, in optional order, a polyamine with a member selected from the group consisting of higher molecular weight carboxylic acids, their anhydrides, esters, and halides containing at least six carbon atoms, to produce a substantial yield of an amide, reacting the resulting amide with an unsaturated polycarboxylic acid or derivative thereof, introducing halogen at a double bond of the unsaturated polycarboxylic acid radical and reacting the resulting compound with a tertiary nitrogenous base.

18. The method of preparing quaternary ammonium compounds which comprises reacting, in optional order, an aliphatic polyamine with a member selected from the group consisting of aliphatic acids, their anhydrides, esters, and halides containing from eight to eighteen carbon atoms, whereby amine hydrogen is replaced by the carboxylic acyl group of said aliphatic acid, and reacting the resulting compound to replace hydrogen of a different amine group of said aliphatic polyamine with the carboxylic acyl radical of a polycarboxylic acid, the polycarboxylic acyl radical containing a quaternary ammonium group.

ALBERT K. EPSTEIN.
MORRIS KATZMAN.